J. W. GUNTER & G. P. HAARDT.
REVERSIBLE FERTILIZER DISTRIBUTER.
APPLICATION FILED SEPT. 27, 1913.
1,097,426.
Patented May 19, 1914.
2 SHEETS—SHEET 1.
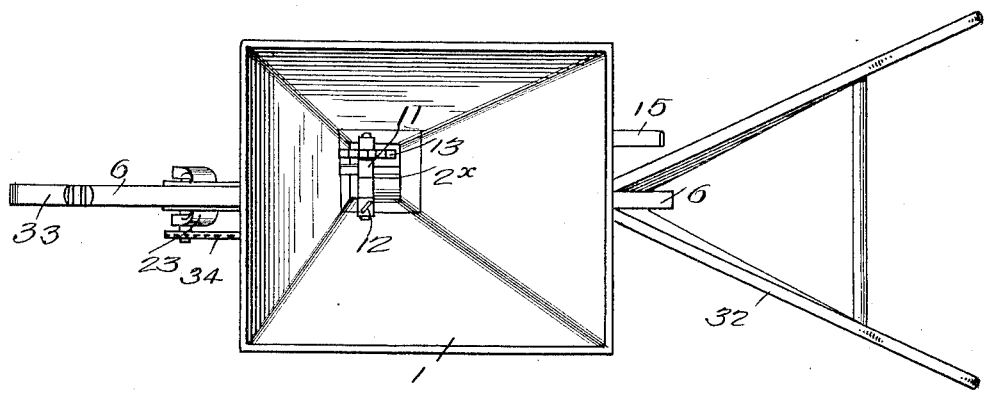
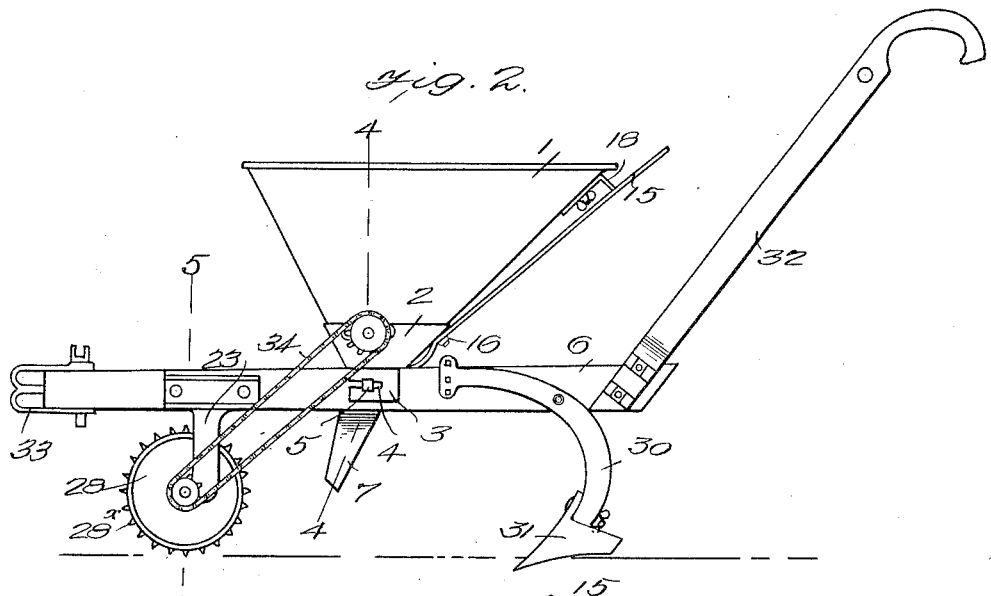
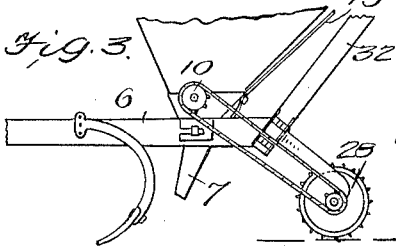
WITNESSES
INVENTORS
John W. Gunter
George P. Haardt
BY
ATTORNEYS J. W. GUNTER & G. P. HAARDT.
REVERSIBLE FERTILIZER DISTRIBUTER.
APPLICATION FILED SEPT. 27, 1913.
1,097,426.
Patented May 19, 1914.
2 SHEETS—SHEET 2.
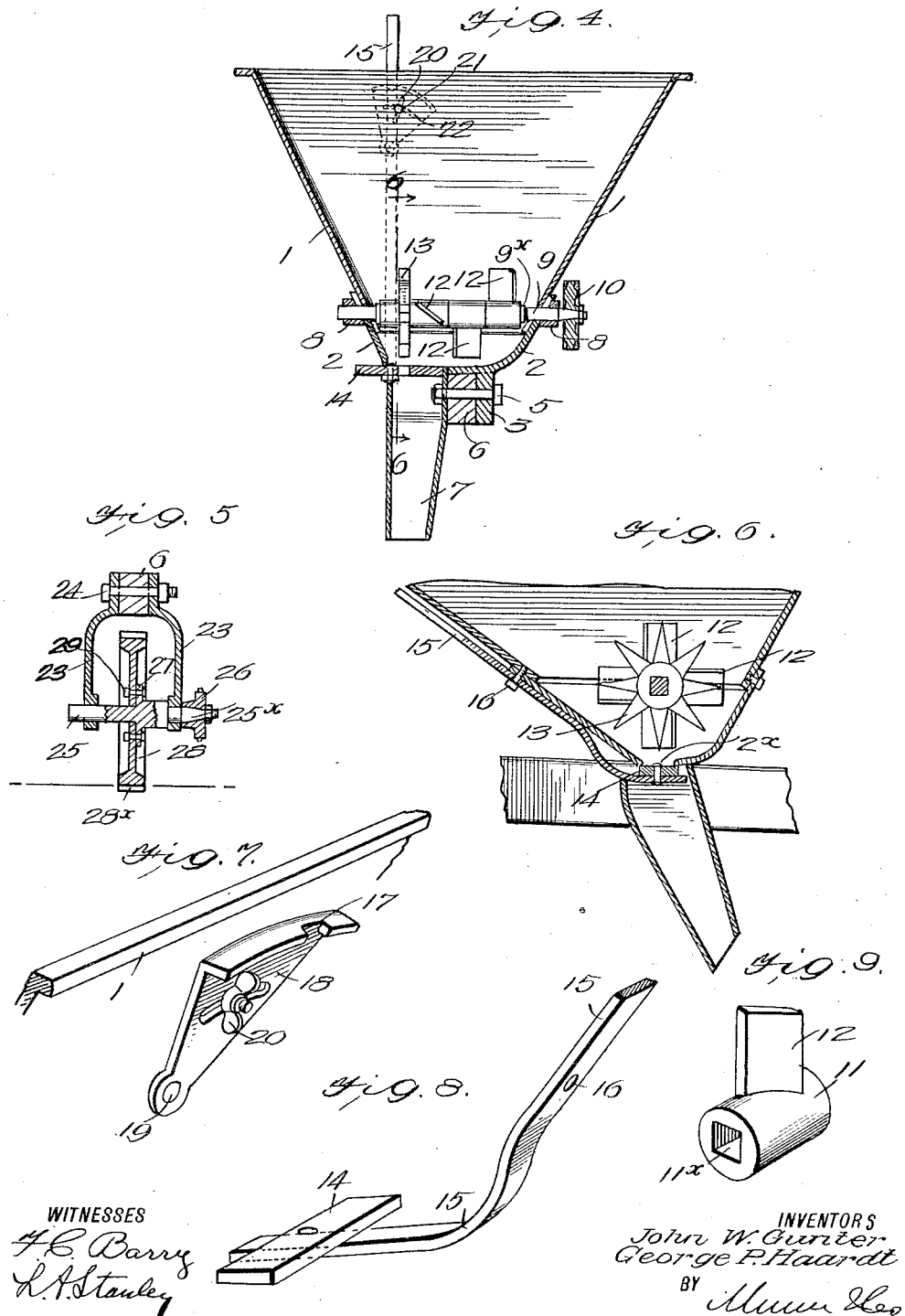

UNITED STATES PATENT OFFICE.

JOHN W. GUNTER AND GEORGE P. HAARDT, OF MONTGOMERY, ALABAMA.

REVERSIBLE FERTILIZER-DISTRIBUTER.

1,097,426.  Specification of Letters Patent.  Patented May 19, 1914.

Application filed September 27, 1913. Serial No. 792,157.

*To all whom it may concern:*

Be it known that we, JOHN W. GUNTER and GEORGE P. HAARDT, citizens of the United States, and residents of Montgomery, in the county of Montgomery and State of Alabama, have made certain new and useful Improvements in Reversible Fertilizer-Distributers, of which the following is a specification.

Our invention relates to devices for distributing fertilizer, and it consists in the combinations, constructions and arrangements herein described and claimed.

An object of our invention is to provide a device which is reversible, so that the drive wheel may be placed either at the front or the rear of the plow blade, thereby permitting the fertilizer to be deposited and plowed under or to be placed in the furrow and covered by the follower.

A further object of our invention is to provide a novel form of feed which may be regulated to feed the desired amount.

A further object of our invention is to provide means for agitating the fertilizer and for forcing it toward the feed opening.

Other objects and advantages will appear in the following specification and the novel features of the device will be particularly pointed out in the appended claims.

Our invention is illustrated in the accompanying drawings forming part of this application in which—

Figure 1 is a plan view of the device, Fig. 2 is a side view of the device, Fig. 3 is a side view showing the parts reversed, Fig. 4 is a section along the line 4—4 of Fig. 2, Fig. 5 is a section along the line 5—5 of Fig. 2, Fig. 6 is a sectional detail view through the feed mechanism, Fig. 7 shows a portion of the locking means for the adjustable feed, Fig. 8 is a perspective view showing a feed regulating means, and Fig. 9 is a detail view showing a portion of the agitating mechanism.

In carrying out our invention we make use of a hopper 1 which may be made of galvanized iron or any suitable material, and which is provided with a bottom portion 2 formed of a casting to which the portion 1 is securely fastened. The casting 2 is provided with a downwardly extending lug 3 which is provided with a slot 4 arranged to receive a bolt 5, by means of which the hopper may be secured to the draft beam 6. A spout 7 is secured to the beam just below the bottom of the hopper, an opening $2^x$ being provided for feeding the material.

Secured to the sides of the casting 2 are bearings 8 for the shaft 9. The latter has a squared tapered portion to which is secured a sprocket wheel 10 on the outside of the hopper as shown in Fig. 4. The shaft 9 is also provided with a squared portion $9^x$ arranged to enter the squared hole $11^x$ of the sleeves 11 to which are secured the angularly disposed blades 12. A plurality of these blades is provided as shown in Fig. 4. On the same shaft is secured an agitator feed wheel 13.

Slidably secured at the bottom of the hopper 2 is a gate 14 which is carried by a rod 15. The latter is bent upwardly and is pivoted at 16 to the casting 2. The handle of the rod 15 is extended and is arranged to enter a slot 17 in a locking plate 18. The latter is pivoted at 19 to the hopper 1 and is provided with a thumb nut 20 on a bolt 21 which enters a slot 22 for purposes of shifting the handle and thereby permitting more or less of the gate 14 to cover the feed opening $2^x$ in the bottom of the hopper.

Secured to the draft beam 6 on each side thereof by means of bolts 24 are downwardly extending brackets 23. These brackets form bearings for a shaft 25, which is provided with a squared tapered end $25^x$ bearing a sprocket 26. The shaft has a collar 27 to which the drive wheel or follower 28 is attached by means of bolts 29. A plow shank 30 may be secured to the draft beam 6 and bears a blade 31. A handle 32 is provided for guiding the device and a draft clevis 33 is provided for attaching draft devices.

From the foregoing description of the various parts of the device the operation thereof may be readily understood.

When the distributer is set up, as shown in Fig. 2 and drawn along, the wheel 28, which as will be seen is provided with traction teeth $28^x$, causes the revolution of the shaft 25 and drives the sprocket 10 through the medium of the sprocket 26 and sprocket chain 34. The revolution of the agitators 12 causes a thorough mixing of the fertilizer and its propulsion toward the feed opening over the spout 7. As stated above, the width of this opening may be varied by moving the handle 15 which can be locked in its position by tightening the thumb nut 20. The wheel 13 provides for the positive feed of the material. It is deposited through the spout and is then covered up by means of the sweep or plow 31, mixing it with the soil and cultivating at the same time.

The device may be changed so as to form the structure shown in Fig. 3 by shifting the plow to a position in advance of the spout 7 and shifting the traction wheel 28 to the rear. In this instance the brackets 23 are placed on the handle 32 as clearly shown in Fig. 3, bolt holes being provided so as to permit this change in location. The device now opens up the furrow and puts the fertilizer in the furrow, the furrow being covered up by the rotary action of the traction wheel 28, which now acts as a follower to cover the fertilizer. The form of the device shown in Fig. 3 is used before the seed is planted. After the seed has come up and the crop is growing, and it needs more fertilizer then the form shown in Fig. 2 is used.

It will be noted that a single bolt 5 secures the spout 7 to the beam 6 and that this same bolt secures the lug 3 to the beam. This construction permits the shifting of the spout to various angular inclinations, and at the same time it permits variation of the tension of the chain 30 by moving the lug 3 forward or backward. The lug 3 and bolt therefore serve not only as a means for fastening on the hopper, but also for adjusting the tension of the chain.

We claim:

1. In a fertilizer distributer, a draft beam, a hopper carried thereby, a spout, and a single fastening member for securing said hopper and said spout to said draft beam, the unloosening of said fastening member serving to permit the angular attachment of the spout and the movement of the hopper longitudinally of the draft beam.

2. In a fertilizer distributer, a draft beam, a hopper provided with a slotted lug arranged to abut said draft beam on the side thereof, a spout arranged on the other side of the draft beam, and a bolt arranged to enter the slot and to pass through said draft beam and said spout for securing the parts together.

3. In a fertilizer distributer, a draft beam, a hopper provided with a slotted lug arranged to abut said draft beam on the side thereof, a spout arranged on the other side of the draft beam, a bolt arranged to enter the slot and to pass through said draft beam and said spout for securing the parts together, a drive wheel, a sprocket carried by the shaft of the drive wheel, a shaft rotatably carried by the hopper and arranged to extend therethrough, said last named shaft being provided with a sprocket, and a chain for connecting the two sprockets, the loosening of said bolt serving to permit the shifting of the hopper to tighten the chain.

4. In a fertilizer distributer, a draft beam, a hopper provided with a slotted lug arranged to abut said draft beam on the side thereof, the bottom of said hopper being provided with a feed opening, a spout arranged on the other side of the draft beam from the lug and being disposed below the feed opening, a bolt arranged to enter the slot in the lug and to pass through the draft beam, the end of the bolt terminating within the spout for securing the latter to the draft beam, a lever pivotally connected with said hopper, the lower end of the lever being bent, and a gate carried by the bent end of the lever and adapted to regulate the size of the feed opening.

JOHN W. GUNTER.
GEORGE P. HAARDT.

Witnesses:
M. L. JENNINGS,
W. J. OSBORNE.